US012756978B2

(12) United States Patent
Abel et al.

(10) Patent No.: US 12,756,978 B2
(45) Date of Patent: Oct. 6, 2026

(54) METHOD AND APPARATUS FOR ESTIMATING SPATIAL CONTENT OF SOUNDFIELD AT DESIRED LOCATION

(71) Applicants: Jonathan S. Abel, Menlo Park, CA (US); Agnieszka Roginska, Woodstock, NY (US)

(72) Inventors: Jonathan S. Abel, Menlo Park, CA (US); Agnieszka Roginska, Woodstock, NY (US)

( * ) Notice: Subject to any disclaimer, the term of this patent is extended or adjusted under 35 U.S.C. 154(b) by 241 days.

(21) Appl. No.: 17/721,284

(22) Filed: Apr. 14, 2022

(65) Prior Publication Data

US 2022/0386063 A1 Dec. 1, 2022

Related U.S. Application Data

(60) Continuation-in-part of application No. 17/164,443, filed on Feb. 1, 2021, now abandoned, which is a
(Continued)

(51) Int. Cl.
*H04R 5/027* (2006.01)
*H04R 3/00* (2006.01)
(Continued)

(52) U.S. Cl.
CPC ............ *H04R 5/027* (2013.01); *H04S 7/302* (2013.01); *H04S 7/303* (2013.01); *H04R 3/005* (2013.01);
(Continued)

(58) Field of Classification Search
CPC ........ H04R 3/005; H04R 5/027; H04R 5/033; H04R 5/04; H04R 1/1016; H04R 1/1041;
(Continued)

(56) References Cited

U.S. PATENT DOCUMENTS

| | | | |
|---|---|---|---|
| 6,016,473 | A | 1/2000 | Dolby |
| 6,507,658 | B1 | 1/2003 | Abel et al. |

(Continued)

OTHER PUBLICATIONS

Hur, Yoomi et al. "Microphone Array Synthetic Reconfiguration", Audio Engineering Society, Convention Paper, Presented at the 127th Convention, Oct. 9-12, 2009, 11 pages.

*Primary Examiner* — Xu Mei
(74) *Attorney, Agent, or Firm* — FOLEY & LARDNER LLP

(57) ABSTRACT

In general, the present embodiments relate to a method and apparatus for estimating spatial content of a soundfield at a desired location, including a location that has actual sound content obstructed or distorted. According to certain aspects, the present embodiments aim at presenting a more natural, spatially accurate sound, for example to a user at the desired location who is wearing a helmet, mimicking the sound a user would experience if they were not wearing any headgear. Modes for enhanced spatial hearing may be applied which would include situation-dependent processing for augmented hearing. According to other aspects, methods and apparatuses record or capture the sound experienced by a number of the participants and devices on and near the field of play, analyze the captured sound for its various components and their associated spatial content, and make those components available to participants and spectators.

8 Claims, 6 Drawing Sheets

Related U.S. Application Data continuation of application No. 15/435,211, filed on Feb. 16, 2017, now Pat. No. 10,911,871, which is a division of application No. 13/224,256, filed on Sep. 1, 2011, now Pat. No. 9,578,419.

(60) Provisional application No. 61/379,332, filed on Sep. 1, 2010.

(51) Int. Cl.
*H04R 5/033* (2006.01)
*H04R 5/04* (2006.01)
*H04S 7/00* (2006.01)

(52) U.S. Cl.
CPC ................ *H04R 5/033* (2013.01); *H04R 5/04* (2013.01); *H04R 2201/023* (2013.01); *H04S 2400/11* (2013.01); *H04S 2400/15* (2013.01); *H04S 2420/01* (2013.01)

(58) Field of Classification Search
CPC . H04R 2420/07; H04R 2201/023; H04S 1/00; H04S 1/002; H04S 1/005; H04S 1/007; H04S 3/00; H04S 3/005; H04S 7/304; H04S 2400/01; H04S 2420/01; H04S 7/302; H04S 7/303; H04S 2400/11; H04S 2400/15
USPC .... 381/26, 74, 309, 310, 91, 92, 122, 1, 17, 381/18
See application file for complete search history.

(56) References Cited

U.S. PATENT DOCUMENTS

| | | | | |
|---|---|---|---|---|
| 6,628,787 | B1 | 9/2003 | Mcgrath et al. | |
| 6,711,270 | B2 | 3/2004 | Masuda | |
| 7,430,300 | B2 | 9/2008 | Vosburgh et al. | |
| 7,561,701 | B2 | 7/2009 | Fischer | |
| 7,634,093 | B2 | 12/2009 | Mcgrath | |
| 7,983,907 | B2 * | 7/2011 | Visser | H04R 3/005 381/94.1 |
| 8,442,244 | B1 | 5/2013 | Long, Jr. | |
| 9,578,419 | B1 * | 2/2017 | Abel | H04S 7/302 |
| 10,911,871 | B1 * | 2/2021 | Abel | H04S 7/302 |
| 2005/0259832 | A1 | 11/2005 | Nakano | |
| 2008/0004872 | A1 * | 1/2008 | Nordholm | G10K 11/17881 704/226 |
| 2010/0303254 | A1 * | 12/2010 | Yoshizawa | G01S 3/8083 381/92 |
| 2012/0020485 | A1 | 1/2012 | Visser et al. | |
| 2014/0119552 | A1 | 5/2014 | Beaucoup | |

* cited by examiner

METHOD AND APPARATUS FOR ESTIMATING SPATIAL CONTENT OF SOUNDFIELD AT DESIRED LOCATION

CROSS-REFERENCE TO RELATED APPLICATIONS

The present application is a continuation-in-part of U.S. patent application Ser. No. 17/164,443 filed Feb. 1, 2021, which application is a continuation of U.S. patent application Ser. No. 15/435,211, filed Feb. 16, 2017, now U.S. Pat. No. 10,911,871, which is a divisional of U.S. patent application Ser. No. 13/224,256, filed Sep. 1, 2011, now U.S. Pat. No. 9,578,419, which claims priority to U.S. Provisional Application No. 61/379,332, the contents of all such applications being incorporated herein by reference in their entirety.

TECHNICAL FIELD

The present embodiments relate to audio signal processing, and more particularly to a method and apparatus for estimating spatial content of a soundfield at a desired location, including a location that has actual sound content obstructed or distorted.

BACKGROUND OF THE RELATED ART

The spatial content of the soundfield provides an important component of one's situational awareness. However, when wearing a helmet, such as when playing football or hockey, or when riding a bicycle or motorcycle, sounds are muffled and spatial cues altered. As a result, a quarterback might not hear a lineman rushing from his "blind side," or a bike rider might not hear an approaching car.

Accordingly, a need remains in the art for a solution to these problems, among others.

SUMMARY

The present embodiments relate to a method and apparatus for estimating spatial content of a soundfield at a desired location, including a location that has actual sound content obstructed or distorted. According to certain aspects, the present embodiments aim at presenting a more natural, spatially accurate sound, for example to a user at the desired location who is wearing a helmet, mimicking the sound a user would experience if they were not wearing any headgear. Modes for enhanced spatial hearing may be applied which would include situation-dependent processing for augmented hearing. According to other aspects, the present embodiments aim at remotely reproducing the soundfield at a desired location with faithful reproduction of the spatial content of the soundfield for entertainment purposes, among other things.

These and other embodiment of the methods and systems disclosed herein enhance the experience of a professional football game for the players, coaches, referees, and fans, both onsite and away from the venue, and both live and offline. An aspect is to record or capture the sound experienced by a number of the participants and devices on and near the field of play, analyze the captured sound for its various components and their associated spatial content, and make those components available to participants and spectators.

This way, for instance, a fan listening from the perspective of the quarterback on a pass play would be enveloped by the sounds of linemen blocking while trying to form a pocket around the quarterback, players signaling each other as the play develops, coaches yelling from their sidelines, and fans and the public announcement system making noise. The spatial content of the soundfield presented to the listener would develop with the play, for example becoming more concentrated in the direction the center of the field were to be chased from the pocket toward the sideline. Note that players and on-field referees could benefit from the safety aspects of hearing spatialized sound, while fans could benefit from having an immersive experience. In a virtual reality setting, a listener, at their option, may locate themselves anywhere in the field of play using sound and positioning information collected from worn microphones on helmets and hats, etc., and other sensors and video analysis.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION OF THE PREFERRED EMBODIMENTS

The present invention will now be described in detail with reference to the drawings, which are provided as illustrative examples of embodiments so as to enable those skilled in the art to practice these and other embodiments. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the embodiments. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1A:
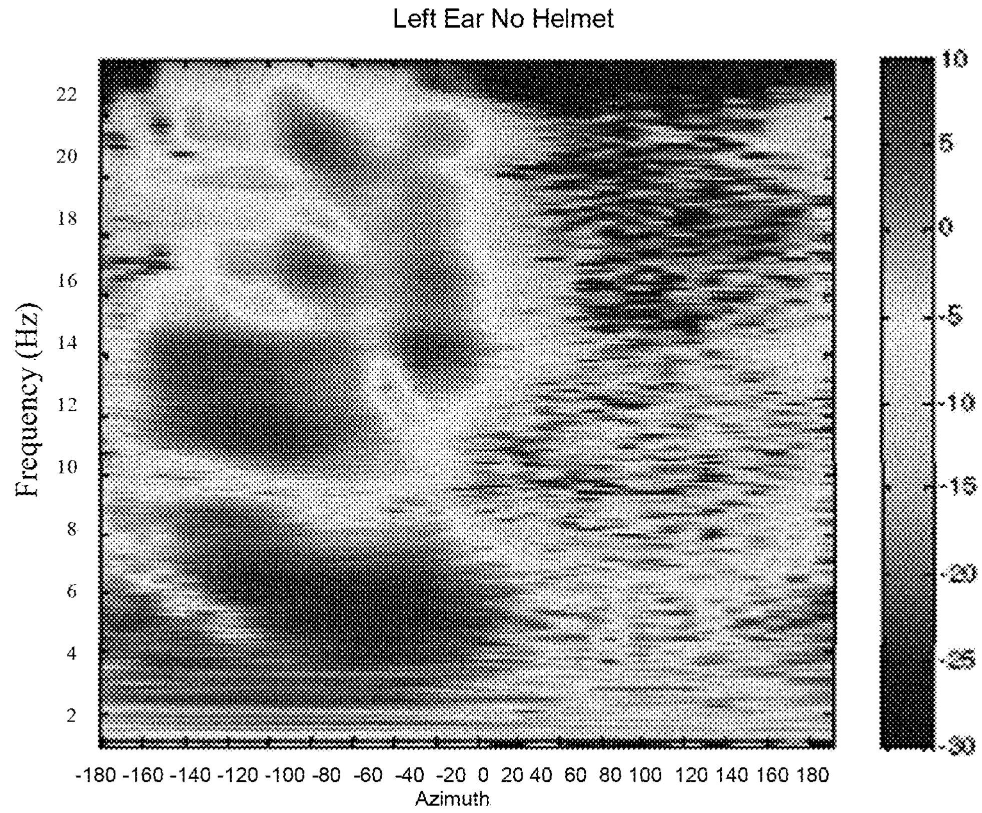
FIGS. 1A-1D illustrate effects of a helmet on perceived sound as a function of frequency and direction of arrival (e.g. azimuth)
Figure 1B:
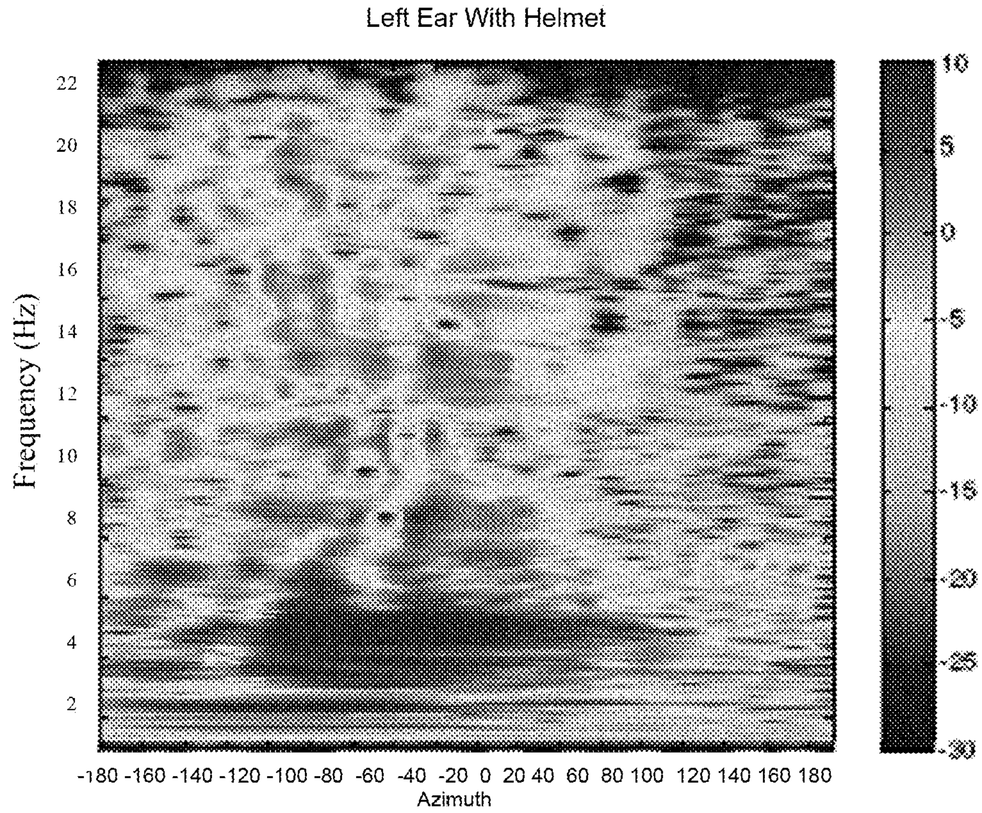
Figure 1C:
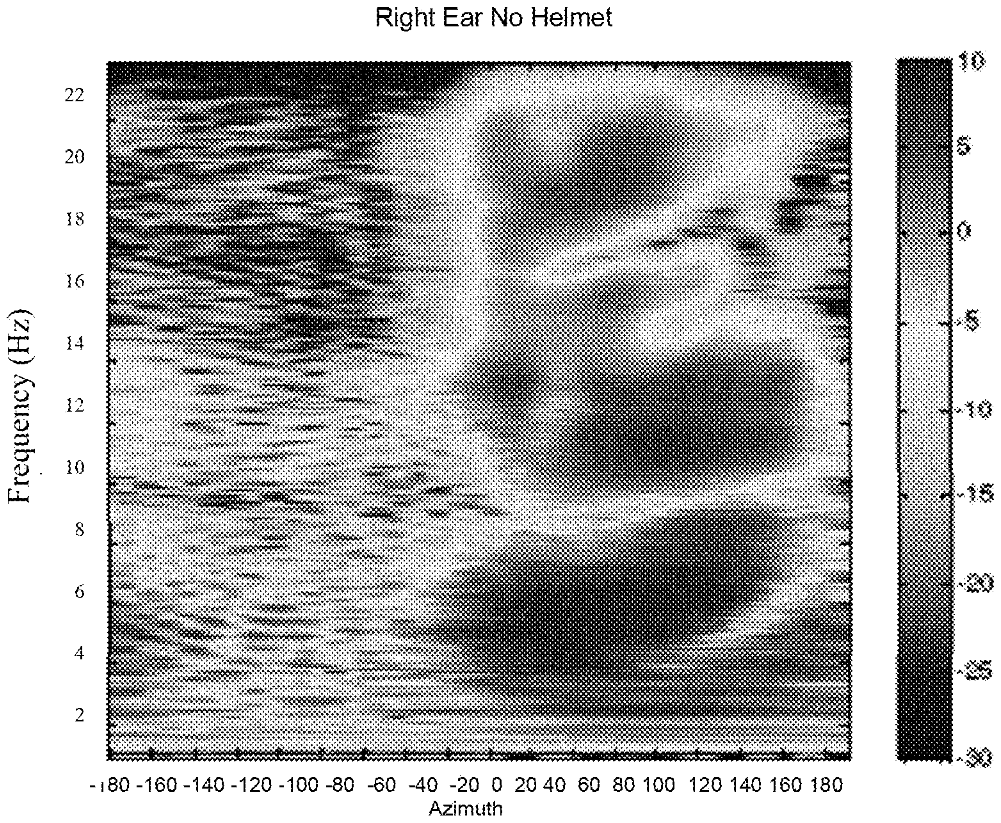
Figure 1D:
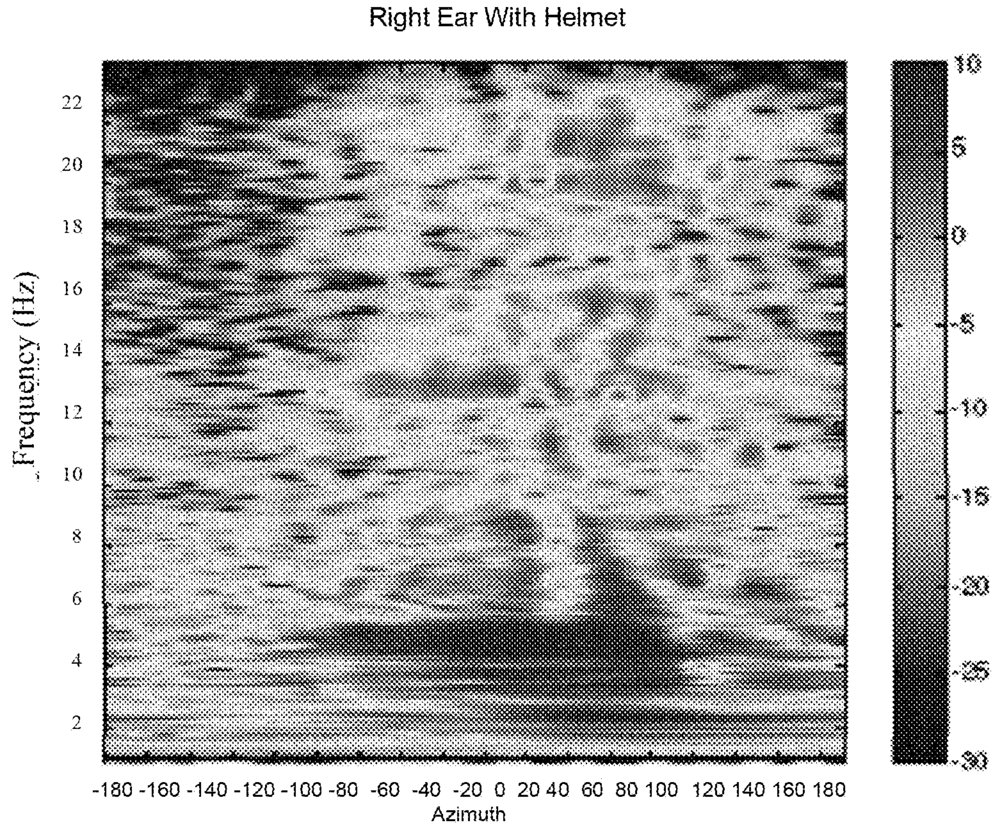

In some general aspects, the present invention recognizes that spatial content of a soundfield at a given location can become distorted and/or degraded, for example by headgear worn by a user at that location. This is illustrated in FIGS. 1A-1D. More particularly, FIGS. 1A and 1B compare the sound energy as a function of frequency and azimuth received in a left ear with and without a helmet, respectively. Similarly, FIGS. 1C and 1D compare the sound energy as a function of frequency and azimuth received in a right ear with and without a helmet, respectively.

To avoid these situations, the present invention incorporates microphones into helmets and hats (and even clothing, gear, balls, etc.) worn by sports participants and riders. The soundfield and its spatial character may then be captured, processed, and passed on to participants and perhaps also to fans. Restoring a player's or rider's natural spatial hearing cues enhances safety; providing spatialized communications among players augments gameplay; rendering a player's, referee's, or other participant's soundfield for fans provides an immersive entertainment experience.

According to some aspects, the present embodiments aim at presenting a more natural, spatially accurate sound to a user wearing a helmet, mimicking the sound a user would experience if they were not wearing any headgear. Modes for enhanced spatial hearing may be applied which would include situation-dependent processing for augmented hearing.

Figure 2:
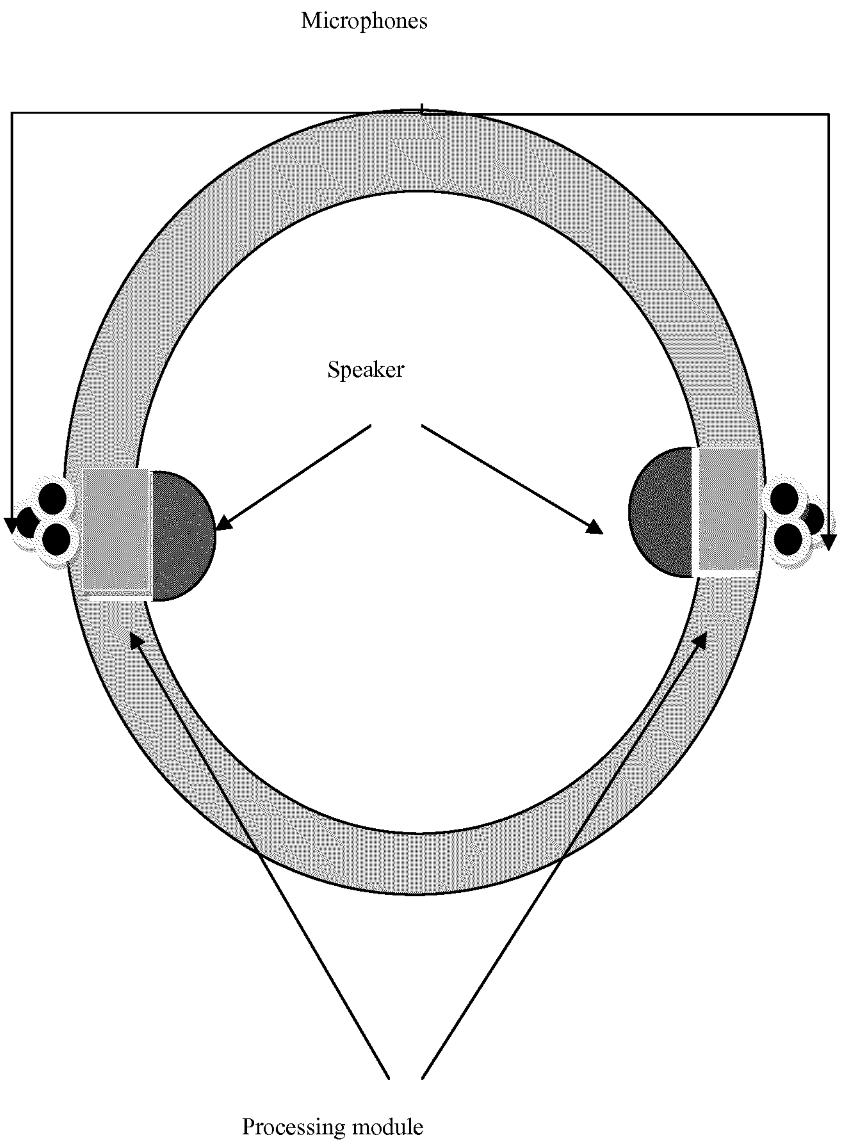
FIG. 2 illustrates an example headgear apparatus according to aspects of embodiments.

In one embodiment shown in FIG. 2, an apparatus according to embodiments consists of headgear (a helmet), which may or may not include a physical alteration (e.g. concha). The helmet includes at least one microphone and speaker. The microphone(s) are located on or around the outside of the helmet. The signal received by the microphone(s) may or may not be manipulated using digital signal processing methods, for example performed by processing module(s) built into the helmet. The processing module(s) can be an x86 or TMS320 DSP or similar processor and associated memory that is programmed with functionality described in more detail below, and those skilled in the art will understand such implementation details after being taught by the present examples.

Figure 3:
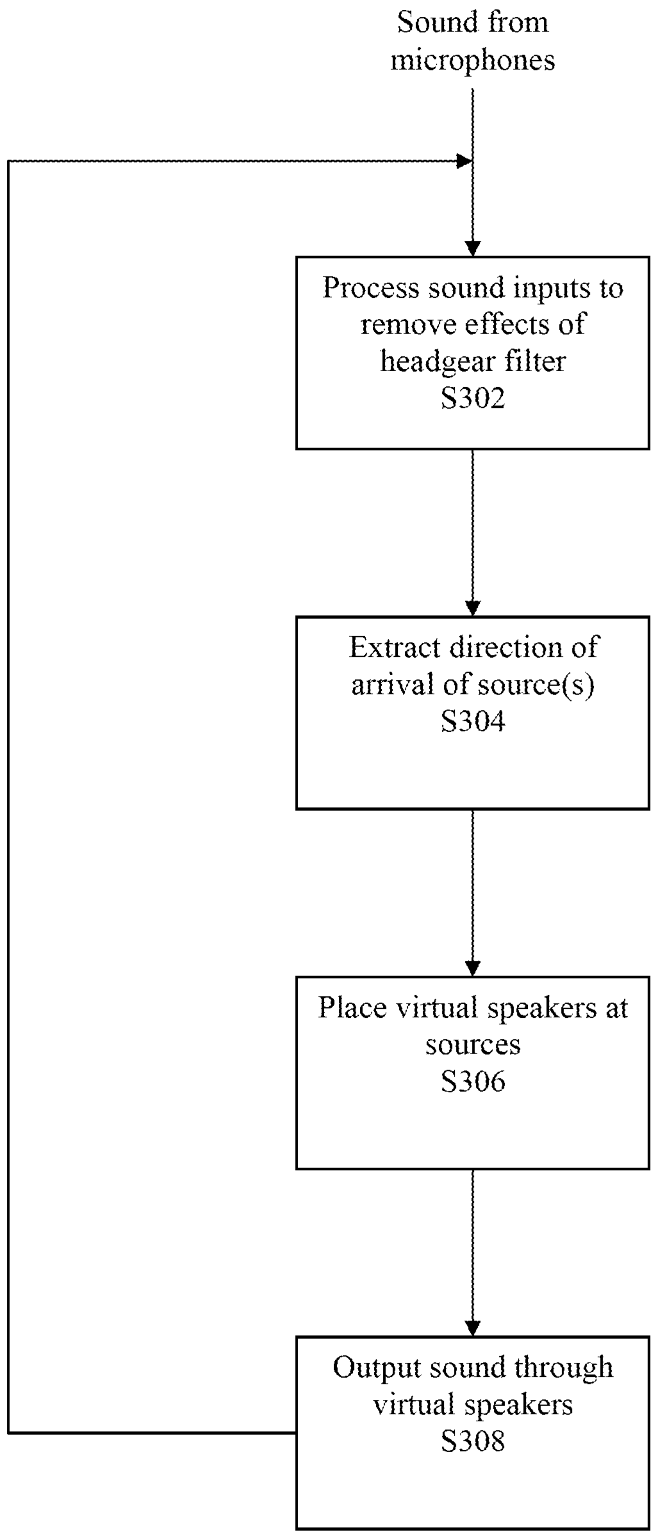
FIG. 3 illustrates an example method according to aspects of embodiments.

An example methodology according to certain safety aspects of embodiments is illustrated in FIG. 3.

As shown in FIG. 3, sound is received from two or more microphones, for example microphones on a helmet as shown in FIG. 2. Other examples are possible, for example, remote microphone(s) on a referee or camera. Other positioning inputs are also possible, such as inputs from an accelerometer, gyro or compass.

In step S302, the sound is processed (if necessary) to remove the effects of the headgear filter. Those skilled in the art will be able to understand how to implement an inverse filter based on a characterized filter such as the filter causing the distortion in FIGS. 1A to 1D.

In step S304, the un-filtered sound and/or positioning input(s) is further processed to extract the direction of arrival of sound source(s) in the inputs. There are many ways that this processing can be performed. For example, one or more techniques can be used as described in Y. Hur et al., "Microphone Array Synthetic Reconfiguration," AES Convention Paper presented at the $127^{th}$ Convention, Oct. 9-12 2009, the contents of which are incorporated by reference herein.

In step S306, virtual speakers are placed at the determined position(s) of the identified source(s), and in step S308, sound is output from the virtual speakers. The output can be a conventional stereo (L/R) output, for example to be played back into real speakers on a helmet such as that shown in FIG. 2. The output can also be played back using a surround sound format, using techniques such as those described in U.S. Pat. No. 6,507,658, the contents of which are incorporated by reference herein.

Figure 4:
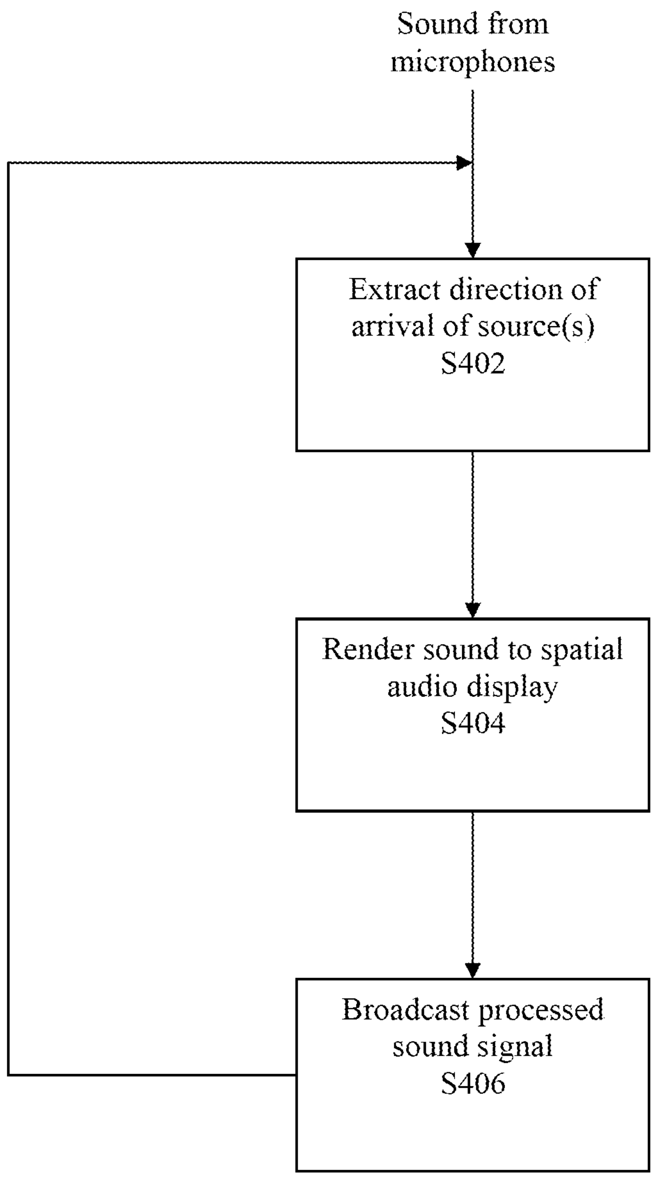
FIG. 4 illustrates another example method according to aspects of embodiments.

An example methodology according to certain entertainment aspects of embodiments is illustrated in FIG. 4.

As shown in FIG. 4, sound is received from two or more microphones, for example microphones on a helmet as shown in FIG. 2. Other examples are possible, for example, remote microphone(s) on a referee or camera. Other positioning inputs are also possible, such as inputs from an accelerometer, gyro or compass.

In step S402, the sound is processed to extract the direction of arrival of sound source(s) in the inputs. There are many ways that this processing can be performed. For example, one or more techniques can be used as described in Y. Hur et al., "Microphone Array Synthetic Reconfiguration," AES Convention Paper presented at the $127^{th}$ Convention, Oct. 9-12 2009, the contents of which are incorporated by reference herein.

In one example implementation, the sound signal(s) received by the microphones are transmitted (e.g. via WiFi, RF, Bluetooth or other means) to a remotely located processor and further processing is performed remotely (e.g. in a gameday television or radio broadcast studio).

In step S404, the processed sound signal is rendered to a surround sound (e.g. 5.1, etc.) or other spatial audio display format, using techniques such as those described in U.S. Pat. No. 6,507,658, the contents of which are incorporated by reference herein.

It should be apparent that other processing can be performed before output, such as performing noise cancellation, and to separate, select and/or eliminate different sound sources (e.g. crowd noise, etc.).

In step S406, the rendered sound signal is broadcast (e.g. RF, TV, radio, satellite) for normal playback through any compatible surround sound system.

Embodiments described herein can find many useful applications.

In Entertainment applications, for example, embodiments include: referee hats, player helmets, clothing, uniforms, gear, balls, "flying" and other cameras outfitted with single, multiple microphones, in-ear, in-ear with hat, helmet-mounted microphones combined with stadium, arena microphones (on down markers, goal posts, etc.); directional microphones, directional processing, raw signals; translation to specific playback systems and formats: e.g., broadcast formats surround, stereo speakers, (binaural) headphones; in-stadium fan, coaches displays; position, head orientation tracking; helmet modifications to enhance or restore altered spatial cues; wind, clothing noise suppression.

In Gameplay applications, for example, embodiments include: wind, clothing noise suppression; Communications between players with position encoded; stereo earphones, at least one microphone or synthesized signal; reverberation to cue distance rather than amplitude reduction; spatialized sonic icons, sonification indicating arrangement of certain own-team players or certain opponent players (possibly derived from video signals); offsides in hockey, e.g. referee signals for improved foul calls (e.g., hear punt, pass released, player crossing boundary such as the line of scrimmage); quarterback (microphone array, advanced helmet) enhanced amplification for sounds arising from the rear; suppressed out-of-plane sounds, enhanced in-plane signals (reduce crowd noise, noise suppression); player positioning, where you are on the field ("hear" the sidelines, auditory display for line of scrimmage.g.); Example applications: football, hockey.

In Safety applications, for example, embodiments of include: bicycle, motorcycle, sports helmets, hats, clothing, vehicle exterior; enhanced volume, sonic icons from rear, sides; amplification of actual soundfield, or synthesized sounds based on detecting the presence of an object via other means; arrival angle tracking for collision detection; Example applications: bike, snowboard, ski, skateboard helmet As set forth above, embodiments of the methods and systems disclosed herein enhance the experience of a professional football game for the players, coaches, referees, and fans, both onsite and away from the venue, and both live and offline. As set forth now in more detail, one aspect is to record or capture the sound experienced by a number of the participants and devices on and near the field of play, analyze the captured sound for its various components and their associated spatial content, and make those components available to participants and spectators.

This way, for instance, a fan listening from the perspective of the quarterback on a pass play would be enveloped by the sounds of linemen blocking while trying to form a pocket around the quarterback, players signaling each other as the play develops, coaches yelling from their sidelines, and fans and the public announcement system making noise. The spatial content of the soundfield presented to the listener would develop with the play, for example becoming more concentrated in the direction the center of the field were the quarterback to be chased from the pocket toward the sideline. Note that players and on-field referees could benefit from the safety aspects of hearing spatialized sound, while fans could benefit from having an immersive experience. In a virtual reality setting, a listener, at their option, may locate themselves anywhere in the field of play using sound and positioning information collected from worn microphones on helmets and hats, etc., and other sensors and video analysis.

Figure 5:
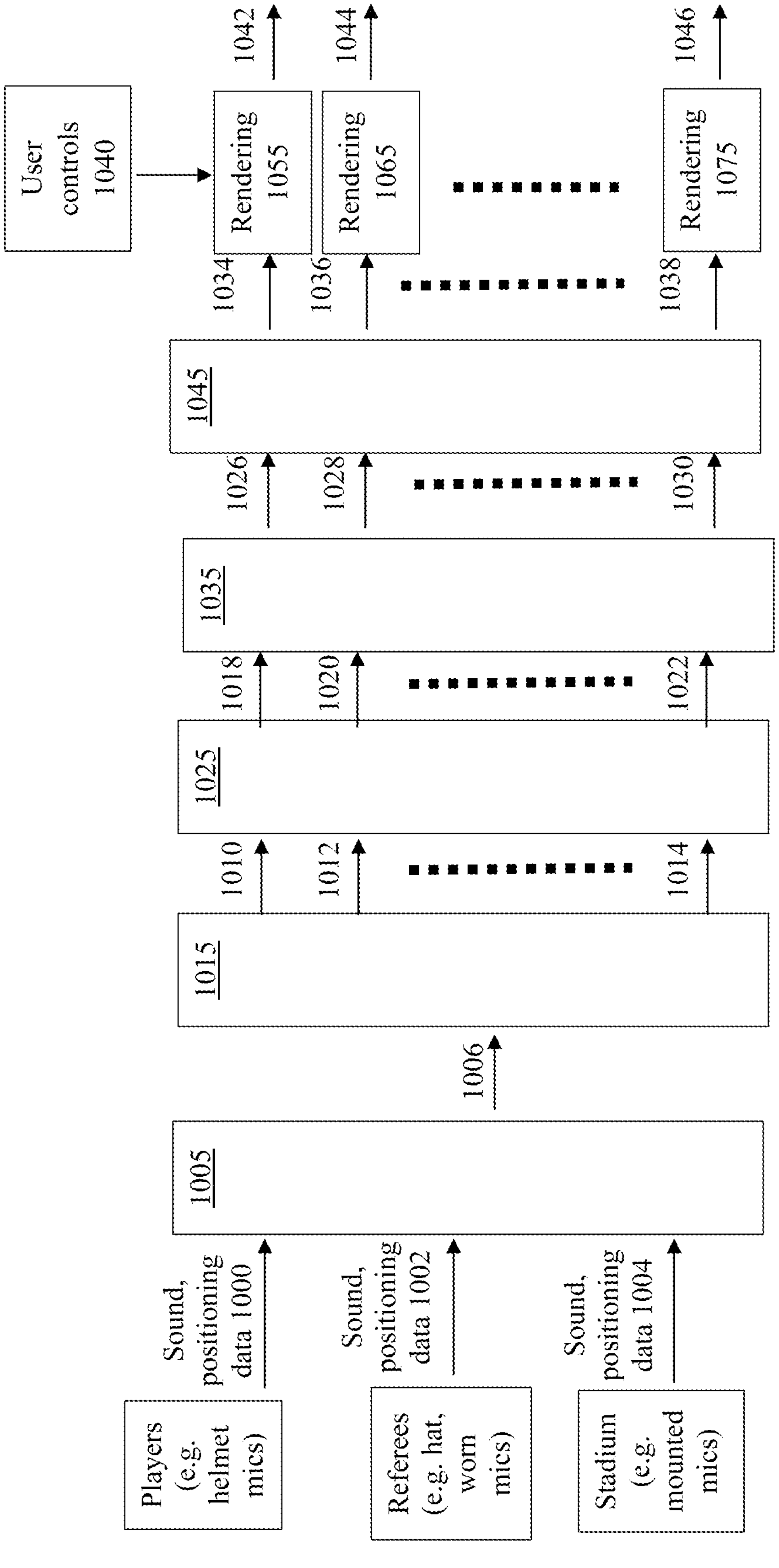
FIG. 5 illustrates another embodiment of the present system in which players have microphones embedded in their helmets or worn, various referees would wear microphones, and cameras, goal posts, down markers, and the like would be outfitted with microphones which capture respective sets of sound signals.

Referring to FIG. 5, in another embodiment of the present system, players have microphones embedded in their helmets or worn, various referees would wear microphones, and cameras, goal posts, down markers, and the like can be outfitted with microphones which capture respective sets of sound signals 1000, 1002, and 1004. The various participants, equipment and stadium features could also have associated devices that capture position information, for instance recording the position on the field and orientation relative to the field of the quarterback's helmet and array of microphones. These audio signal sets and positioning data are captured by the sound capturing, positioning, and monitoring processor 1005, and selected and sent on to spatial processor 1015 which estimates the different sound components "heard" by the microphone sets, and taking into account the associated positioning information estimates their spatial content. These estimated sound components and associated spatial descriptions 1010, 1012, and 1014, which can be categorized into point and spatially diffuse sound sources, such as described in Y. Hur, et al. "Microphone Array Synthetic Reconfiguration," presented at AES 127$^{th}$ Convention, New York, NY, Oct. 9-12, 2009, the contents of which are incorporated herein by reference in their entirety. These can include sounds from player-close microphones that are used to capture player speech and sideline shotgun or parabolic mics used to capture line-of-scrimmage sound, are sent on to mixing and encoding processor 1025.

The processor 1025 will process the input signals, applying audio effects such as equalization and compression for fixative or artistic purposes, and combining the signals into different mixes such as stereo, 5.1 or Atmos surround, binaural, or Ambisonic mixes, or as a component sound or sounds with associated spatial information. separate mixes could be made for any number of listeners in mind, for instance, players, coaches, referees, stadium fans (boxes and seats, according to their section). These mixes are encoded for transmission (e.g., broadcast, streaming, and the like) or storage (e.g., cloud) to produce encoded signals and associated spatial information 1026, 1028, and 1030, in any number of formats such as stereo, binaural, 5.1, 7.1, 5.1.4, and 10.2 surround, Ambisonics, and position tagged audio signal sets. The mixes are transmitted and/or stored using processor 1035, and maybe received or retrieved using processor 1045.

Received or retrieved mixes 1034, 1036, 1038 are then rendered using rendering processors 1055, 1065, and 1075 to produce sound 1042, 1044, and 1046 for listeners in any number of settings. In one setting, a listener wearing headphones with a head orientation tracking device will have the mix of positioned sources rendered locally 1055 using a binaural format, taking into account their look direction. This rendering could be used to provide enhanced audio to fans at the stadium. It could also be used to provide spatialized audio to people watching the gameplay on a device, for which head tracking would not be needed, as the listener could be presumed to be looking at the device screen. In another setting, viewers could be watching the game in a living room with surround audio, and the audio rendered locally 1065 according to received audio component position information, or rendered in the mixing/encoding processor 1025, in which the camera angle and other video context would be used to control aspects of the sound spatial character such as the viewpoint. In yet another setting, a room could be outfitted with a number of loudspeakers, and one of the surround mixes repurposed to the room configuration, or an Ambisonics or similar technique used to pan sound components to their appropriate spatial locations 1075.

It should be noted that those skilled in the art will understand how to adapt the embodiment described above to other sports and activities such as hockey, basketball, baseball, soccer, tennis, golf, short track ice skating, road and track bicycle racing, skiing, boxing among many others. In these activities, microphones are worn by participants and referees, and mounted on equipment and the venue, and the signals captured, and processed to present spatialized sound to listeners. In hockey, the players' and referees' helmets are natural mounting places, as are the goals. The home plate umpire would be a good perspective to present from a baseball game, and the net posts and umpire's chair good places for tennis. Yet another possible scenario is if a player is wearing a close microphone, as in a quarterback and the microphone is used to talk with the coaches, and their position is known relative to a listener's viewpoint, for example through video analysis or a worn tracking device, then the close microphone sound can be rendered as coming from the desired location for the listener.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to the preferred embodiments thereof, it should be readily apparent to those of ordinary skill in the art that changes and modifications in the form and details may be made without departing from the spirit and scope of the embodiments.

What is claimed is:

1. A method comprising:

receiving sound signals from two or more microphones;

processing the received sound signals to determine a direction of arrival and position of a sound source in the received sound signals;

combining the received sound signals with additional sound from an additional mounted or worn microphone;

adapting the combined received sound signals and the additional sound from the additional mounted or worn microphone according to a listener/viewer perspective, wherein the combined received sound signals and the additional sound are adapted according to a first adaptation when the listener/viewer has a first perspective relative to the determined position of the sound source, and wherein the combined received sound signals and the additional sound are adapted according to a second different adaptation when the listener/viewer has a second perspective relative to the determined position of the sound source that has been changed from the first perspective; and rendering the determined sound source to a spatial audio display format to simulate the determined position of the sound source.

2. The method of claim 1, wherein receiving sound signals includes capturing audio and spatial information from multiple worn microphones.

3. The method of claim 1, wherein rendering includes rendering spatialized audio to one or both of participants and observers of an event.

4. The method of claim 1, wherein receiving sound signals includes receiving associated position information associated with at least one of the two or more microphones.

5. The method of claim 4, wherein rendering includes using the received associated position information of the at least one of the two or more microphones.

6. The method of claim 1, wherein the two or more microphones are affixed to an airborne camera.

7. The method of claim 1, wherein the two or more microphones are affixed to a stadium fixture.

8. The method of claim 1, where the listener/viewer perspective includes a position of the listener/viewer relative to the determined position of the sound source.

* * * * *